(No Model.)
R. M. KEATING.
NUT LOCK.
No. 379,278.        Patented Mar. 13, 1888.
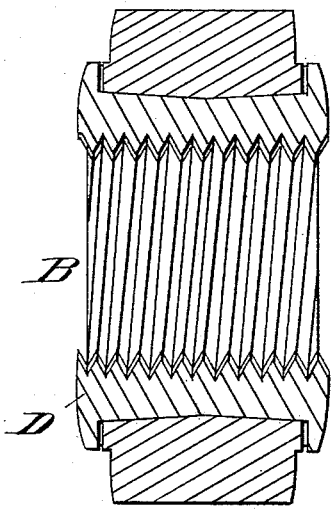
Fig. II.
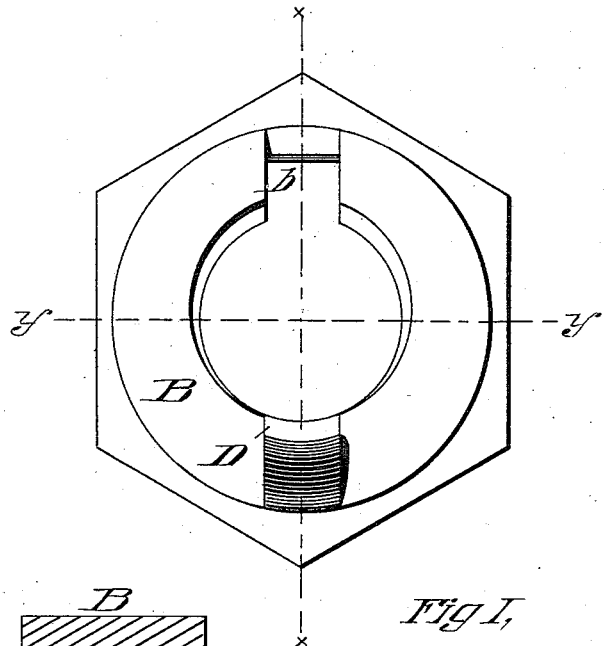
Fig. I.
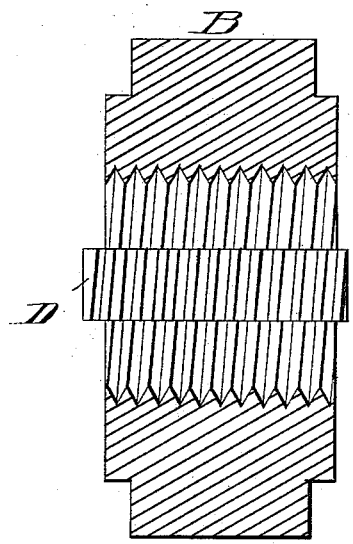
Fig. III.
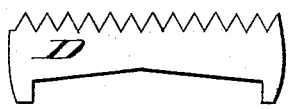
Fig. IV.
Fig. V.
Witnesses,
N. H. Murphy.
Timothy W. Brown.
Inventor,
R. M. Keating,
By R. F. Hyde.
Atty.

United States Patent Office.

ROBERT M. KEATING, OF SPRINGFIELD, MASSACHUSETTS, ASSIGNOR OF ONE-HALF TO WILLIAM H. MURPHY, OF SAME PLACE.

NUT-LOCK.

SPECIFICATION forming part of Letters Patent No. 379,278, dated March 13, 1888.

Application filed December 27, 1886. Serial No. 222,571. (No model.)

*To all whom it may concern:*

Be it known that I, ROBERT M. KEATING, a citizen of the United States, residing at Springfield, Hampden county, and State of Massachusetts, have invented a new and useful Improvement in Lock-Nuts, of which the following is a specification.

My improvement in lock-nuts consists in the combination and construction, as hereinafter described, and more particularly pointed out in the claims.

My invention is fully illustrated in the accompanying drawings, in which—

Figure I is a plan view of my improved nut having a part removed. Fig. II is a sectional view of one-half of a complete nut on the dotted line $x\,x$ of Fig. I. Fig. III is a sectional view of one-half of a nut on the dotted line $y\,y$ of Fig. I, and Figs. IV and V are detail views.

My invention consists in a segment threaded to conform to the nut-threads seated in a groove in the nut parallel to the axis of its bore to cause its threads to coincide with those of the nut, arranged to have an end project beyond the face of the nut when the segmental and nut threads coincide, and adapted to slide in its seat in the nut to have its threads thrown from coincidence with those of the nut proper.

B is a nut, enlarged in the drawings to twice the size of the nut commonly used in securing the fish-plates of railway-tracks.

*b* is a groove formed in the threaded wall of the nut.

D is a segment adapted to be received within the groove *b*, to have its threads coincide with those of the body of the nut, and adapted to have one end project from the face of the nut in the direction of the surface against which the nut is to be forcibly screwed, and further adapted to have longitudinal play in the groove *b*, while having its back seated against a corresponding bottom of the groove *b*.

It will be seen that in operation the nut and segment will travel upon a bolt as a solid nut until opposition is encountered, the side walls of the groove *b* taking the segment with the nut in its rotation, but that when the projecting end of the segment brings up against an unyielding surface—such as the wall of a fish-plate—any further rotation of the nut will bring its threads out of coincidence with those of the segment D; and in practice the segment, having its longitudinal motion arrested and being compelled to rotate with the nut, has its thread corners thrown out and dug into the threads of the bolt at the angle made by said threads to a plane at right angles to the axis of the bolt. As the threads of the segment are forced into the sides of those of the bolt and are out of true with them, and as the end of the segment is the direct point of contact with the face against which the nut is clamped and receives all of the jar operative to loosen the ordinary nut, while the segment is unable of itself to rotate, the nut is firmly locked until by the action of the wrench upon the nut the segment is restored to a coincidence with the rest of the nut and is free with it to be unscrewed as easily as the common nut. As by the employment of one segment upon the perimeter of a bolt force exerted upon the nut to cause it to bear at a point so far from its center might bend the bolt, I prefer to employ more than one, as shown in the drawings, and so dispose them as to balance the strain upon both sides of the axis of the bolt.

To make more effective the longitudinal movement of the segment D in displacing its teeth or threads relative to the threads of the bolt and nut proper, I form the back of the segment and the corresponding bottom of groove *b* of a wedge shape, so that said longitudinal movement of the segment will also be a radial one toward the axis of the bolt, by which means the displaced threads of the segment are caused to lock more firmly with the bolt.

In practice I prefer to form the nut as shown, with a double wedge upon the back of the segment and with its ends projecting upon both faces of the nut, by means of which no care is required to enter the bolt upon a particular side of the nut.

In practice the best results are obtained by forming the segment of hard steel.

In Fig. III the segment shown in plan view is represented as being thrown out from the threads of the nut.

I am aware that a nut has been patented in which there was a sliding piece similar to mine in many respects. In that, however, the bearing-face of the sliding piece and nut is parallel with the axis of the bolt, and the bolt is slotted or grooved to receive the piece.

Now having described my invention, what I claim is—

1. The combination, with a screw-bolt having a solid cylindrical body, of a nut having a longitudinal groove through its threaded portion and a threaded segment in said groove, the end of the segment projecting beyond the face of the nut, so that the tightening of the nut against a plane surface will slide the segment in the groove, substantially as described.

2. The lock-nut described, having a groove extending longitudinally across its threads, the base of said groove being inclined relatively to the axis of the nut, combined with a movable segment in said groove, the segment having a wedge-bearing in the groove, as set forth.

ROBERT M. KEATING.

Witnesses:
R. F. HYDE,
W. H. MURPHY.